INVENTOR.
LINCOLN B. DUMONT
BY
Don Finkelstein
ATTORNEY 3,163,984
SUPERCHARGED INTERNAL COMBUSTION
ENGINE ARRANGEMENT
Lincoln B. Dumont, 5850 W. 88th St., Los Angeles, Calif.
Filed Nov. 13, 1962, Ser. No. 237,069
3 Claims. (Cl. 60—13)

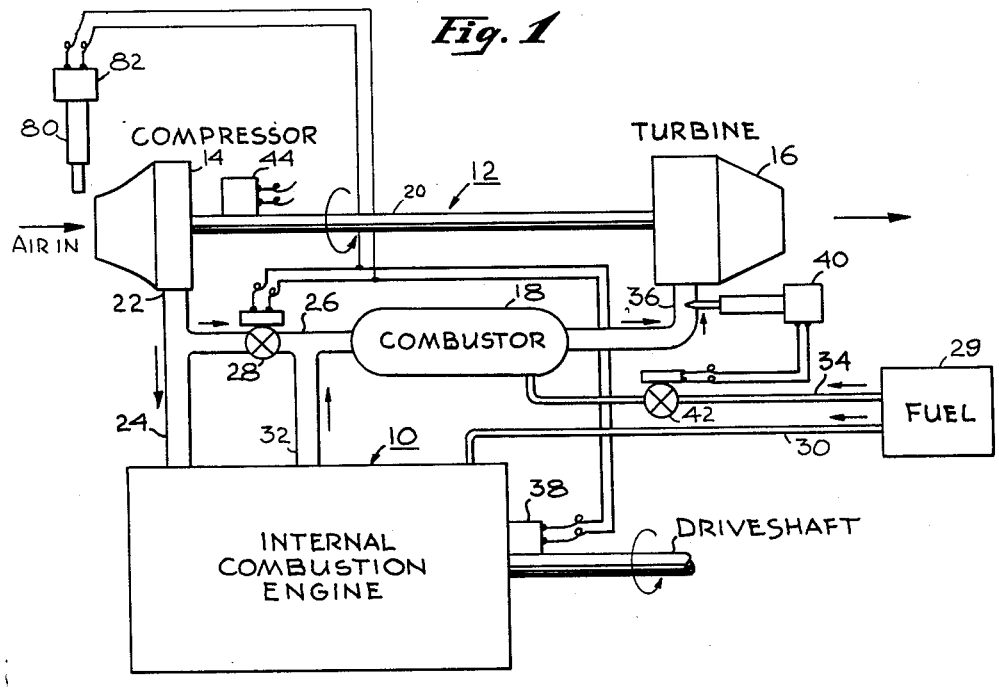
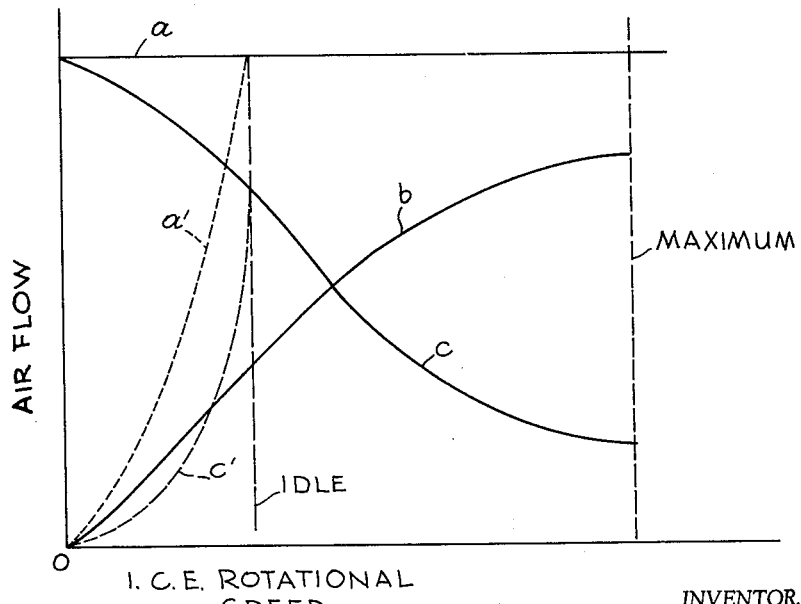

This invention relates to the internal combustion engine art and more particularly to an improved supercharged internal combustion engine that provides increased engine power throughout wide variations of engine rotational speed.

The main advantage generally desired in utilizing a supercharged internal combustion engine rather than a plain internal combustion engine is that supercharging the air input into the internal combustion engine provides a higher power output from the internal combustion engine. This is generally achieved at less weight and greater efficiency by providing the supercharger than by making a larger internal combustion engine. Most prior superchargers for internal combustion engines, particularly those utilized in automobiles and the like, have been either belt or gear driven from the engine itself. This, of course, limited the speed of the supercharger to some fixed ratio of the speed of the internal combustion engine and thus, in general, the pressure of the compressed air from the supercharger was low when the engine speed was low and only increased as engine speed was increased. Even some of the turbine-driven compressors incorporating a turbine driven by the exhaust gases from the internal combustion engine have had this same characteristic, since the volume of exhaust gas, when the internal combustion speed is low, is also low. This resulted in a low turbine power output, low compressor speed and, consequently, a low compressor discharge pressure.

Thus, there has been a longstanding need for a supercharger arrangement that would provide a high air pressure for the internal combustion engine at low engine speeds. For example, when the engine is accelerating from idle up to operating speeds, it is desirable to have a high power increase rather than the low power increase inherent in the superchargers utilized in the past. Most superchargers, of the type utilized in the past, have not been able to provide this power increase at low engine speeds. The acceleration of a turbine-driven type supercharger is often a deterrent to attaining full power, since the supercharger accelerates at a much lower rate than that of which the engine is capable of accelerating. Thus, prior superchargers acted as a drag on the internal combustion engine during acceleration and thereby reduced the engine's rate of speed and power build-up.

Therefore, it is an object of this invention to provide an improved turbo-supercharger arrangement.

It is another object of this invention to provide an improved turbo-supercharger arrangement adapted to be utilized with internal combustion engines.

It is another object of this invention to provide a turbo-supercharger arrangement in which the delivery pressure from the compressor is substantially independent of internal combustion engine speed.

It is yet another object of this invention to provide a turbo-supercharger arrangement for an internal combustion engine in which the turbo-supercharger may be operated at substantially its most efficient operating condition independently of the operating condition of the internal combustion engine.

The above and other objects are achieved, generally, according to one embodiment of applicant's invention, by providing an internal combustion engine with a turbo-supercharger that is operable at a speed independent of the speed of the internal combustion engine. The turbo-supercharger comprises an air compressor driven by a hot gas turbine and the turbine is powered by the products of combustion generated in a combustor. The compressed air discharged from the air compressor is divided into two parts: a first part is delivery to the internal combustion engine for utilization therein; the second part is delivered directly to the combustor. The exhaust gas therein from the internal combustion engine is also transmitted to the combustor and mixed with the second part of air. A supply of fuel at a preselected, controllable flow rate is transmitted to the combustor and in the combustor the fuel is burned with the mixture of the second part of the compressed air and the exhaust gases from the internal combustion engine. The products of this combustion are then transmitted to drive the turbine. The turbine, in turn, drives the compressor.

Means are included to vary the amount of air contained in the second part of the air from the air compressor that is transmitted to the combustor. This amount of air is controlled as a function of an operating characteristic and air requirements of the internal combustion engine. For example, applicant has found it advantageous to predicate the amount of air inducted directly from the compressor to the combustor upon the speed of the internal combustion engine. Thus, a control valve, for example, of the motor-driven butterfly type may be positioned in the duct transmitting air from the compressor to the combustor and may be operated in response to a measured speed of the internal combustion engine and this control valve will vary the amount of air that comes directly from the compressor to the combustor. When the engine speed is low the valve will be opened to allow a comparatively large amount of air to flow directly from the compressor into the combustor and only a small amount, which is all that the internal combustion engine requires, to flow into the internal combustion engine. As the speed of the internal combustion engine increases, the valve progressively closes, thereby decreasing the amount of air that flows directly from the compressor into the combustor and increasing, as required, the amount of air flowing from the compressor to the internal combustion engine. When the internal combustion engine reaches maximum speed, the valve may be in a position to allow most of the air to flow directly from the air compressor to the internal combustion engine and only a comparatively small amount to flow from the air compressor directly into the combustor. However, the total volume of gas flow through the combustor is always comprised of the total output of the air compressor since the exhaust from the internal combustion engine is always transmitted into the combustor. Thus, the volumetric flow rate of the products of combustion from the combustor, which power the turbine, is also substantially constant and the turbine may thus be designed to run at its design speed, or close thereto, throughout a wide range of internal combustion engine speeds. This provides a high air pressure throughout the speed range of the internal combustion engine.

An overriding control may also be supplied from a monitoring system that measures the temperature of the products of combustion of the combustor. Thus, a temperature-measuring system measuring the gas inlet temperature to the turbine may be utilized as a basic control to vary, within narrow limits, the fuel that flows to the combustor in order to maintain the temperature of the combustion products from the combustor at a predetermined level. By decreasing the fuel flow rate into the combustor when the temperature of the products of combustion from the combustor entering the turbine exceeds a predetermined value, the temperature of the products of combustion entering the turbine is brought back to the preselected value. The fuel flow to the combustor may also be controlled to vary the speed of the supercharger.

In another embodiment of applicant's invention the exhaust gases from the internal combustion engine are ducted directly to the turbine and the only gas flowing through the combustor is the second part of the air from the compressor that is ducted through a control valve directly to the combustor. In this embodiment the combustor, of course, may be smaller than the combustor in the above-described embodiment; however, it must be adapted to burn efficiently variable volumes of air coming directly from the compressor.

The above and other embodiments of this invention are more fully disclosed in the following detailed description with reference to the accompanying drawings, wherein similar reference characters refer to similar elements and in which:

FIGURE 1 is a semi-schematic representation of a supercharged internal combustion engine according to one embodiment of applicant's invention;

FIGURE 2 is a graph showing the relationships between the internal combustion speed and the volumetric air flow in the embodiments of applicant's invention;

Figure 3:
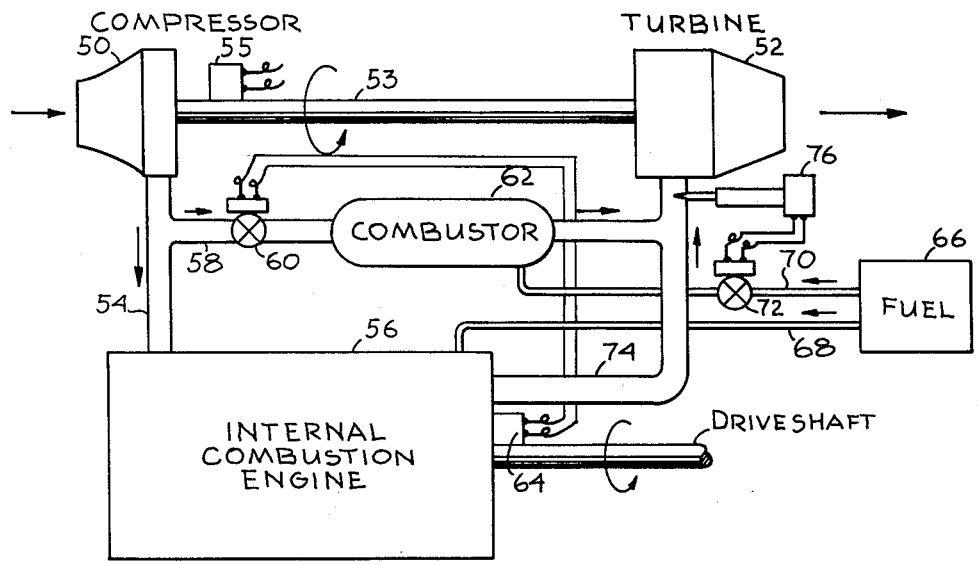
FIGURE 3 is a semi-schematic representation of another embodiment of applicant's invention.

Referring now to FIGURE 1, there is shown a schematic diagram of the structural arrangement of one embodiment of applicant's invention. As shown in FIGURE 1, an internal combustion engine 10, which may be an automobile engine, a heavy industrial engine, or the like, is provided with a turbo-supercharger arrangement generally designated 12 designed to provide increased power in the internal combustion engine. The turbo-supercharger 12 may be considered to be comprised of three basic units, a rotary air compressor 14, a turbine 16 and a combustor 18. The turbine 16 is powered by the gases generated in the internal combustion engine and in the combustor 18, and the turbine 16 drives the compressor 14 through driveshaft 20. One characteristic of the rotary air compressor 14, which preferably is of the continuous-flow type, is that the pressure rise across the compressor is proportional to the compressor rotational speed. In reciprocating piston-type compressors, of course, the output pressure is substantially independent of speed. However, in the preferred embodiment of applicant's invention a rotary-type air compressor is utilized for the air compressor 14. Therefore, to achieve the maximum benefit from the supercharger 12, it is desirable, in this embodiment, that the output pressure of the compressor 14 be maintained at preselected values for substantially all operating conditions of the internal combustion engine 10. This provides the internal combustion engine 10 with compressed air at a preselected pressure for a given atmospheric environment, to thereby achieve a greater proportional power output from the internal combustion engine 10 at all rotational speeds thereof.

The air coming from the compressor 14 at the compressed air discharge 22 thereof is divided into two parts: a first part is transmitted by duct 24 into the internal combustion engine 10 for utilization therein; a second part of the compressed air from the air compressor 14 is transmitted by duct 26 through valve 28, hereinafter described in more detail, to the combustor 18. Thus, the total compressed air output of compressor 14 is comprised substantially of only the first part that is ducted through duct 24 to the internal combustion engine 10 and the second part that is ducted through duct 26 to the combustor 18.

The internal combustion engine 10 receives the first part of the compressed air from compressor 14 transmitted thereto by duct 24 and burns this air in a well-known manner with fuel from fuel tank 29 transmitted to the internal combustion engine 10 through fuel line 30. The exhaust gases generated in engine 10 are transmitted to the combustor 18 through duct 32. Thus, the combustor receives both the second part of the compressed air directly from the compressor 14 and the exhaust gases from the internal combustion engine 10. Since the internal combustion engine 10 receives the first part of the air from air compressor 14, the exhaust gas volume from the internal combustion engine 10 combined with the volume of the second part of the compressed air is always substantially constant. Thus, in this embodiment, the combustor 18 may be designed for a substantially constant volume of gas flowing therethrough. In the combustor 18 the second part of the air from the compressor 14 together with any unburned air in the exhaust from the internal combustion engine 10 is burned with fuel which, for convenience, may be transmitted to the combustor 18 from the fuel tank 29 through fuel line 34. The products of combustion generated in the combustor are then transmitted through duct 36 to the turbine 16 which, for example, may be of a hot gas type adapted to receive the products of combustion from the combustor 18 and to generate power therefrom to drive the compressor 14 through driveshaft 20.

Coupled to the internal combustion engine 10 is a rotational speed measuring means such as the tachometer means 38 which is adapted to measure the rotational speed of the internal combustion engine 10 and to generate a signal having a magnitude proportional thereto. This signal is conducted to the valve 28 which, for example, may be a motor operated butterfly valve which is adapted to receive the signal generated by the tachometer 38 and to open and close the flow passage in duct 26 in response to the signal magnitude. Thus, when the rotational speed of the internal combustion engine is low, the air required by the internal combustion engine is low, and the valve 28 is opened to a comparatively wide open position to allow most of the air from the compressor 14 to be transmitted directly to the combustor 18. As the speed of the internal combustion engine increases the air requirement of the internal combustion engine 10 also increases and the valve 28, upon receipt of the signal from the tachometer 38, responsively closes so that the air in the first part of the compressed air that is transmitted directly to the internal combustion engine 10 increases proportionately and the air transmitted from the air compressor 14 directly to the combustor 18 is decreased proportionately. However, since the exhaust gases from the internal combustion engine 10 are also transmitted to the combustor 18 through duct 32, the total volume of gas passing through the combustor 18 is substantially constant.

As described above, the gases in the combustor 18 are burned with fuel from fuel tank 29 and the products of combustion thus generated are transmitted to the turbine 16. Since the volume of gas coming into the combustor 18 is substantially constant, the volume of gas transmitted to the turbine 16 through duct 36 is also substantially constant. By having the volume of gases passing through the combustor and the turbine substantially constant and unvarying, a definite advantage is obtained. Both the combustor and the turbine may be designed for operation at their most efficient point and at this point there will be substantially continuous operation, since the volumetric flow through the combustor 18 and the turbine 16 is substantially unvarying.

To insure that the temperature of the gas entering the turbine 16 does not increase to a point beyond that desired, since in many applications it is desirable to fabricate the turbine wheel of turbine 16 of comparatively inexpensive materials, a temperature measuring means such as thermocouple means 40 is adapted to measure the temperature of the gases entering the turbine 16 and to transmit a signal having a magnitude proportional to the measured temperature to valve 42 in the fuel line 34.

Valve 42 may, for example, be a motor operated butterfly type similar to valve 28.

If the temperature of the exhaust gases entering the combustor 18 increases to too high a value, which, for example, could happen under sustained high speed operational conditions of the internal combustion engine 10, the products of combustion generated in the combustor 18 may become too hot for suitable operation of the turbine 16. In that event, the thermocouple 40 detects this increase of temperature and decreases the fuel flow through fuel line 36 to the combustor 18. By decreasing the fuel flow to the combustor 18, the temperature rise of the gases through the combustor 18 is lowered and the temperature of the products of combustion entering the turbine is maintained at a value sufficiently low to prevent over-temperature operation of the turbine 16. The second part of the compressed air from the compressor 14 that is transmitted to the combustor 18 also serves, in some measure, to decrease the temperature of the exhaust gases from the internal combustion engine 10 as it enters the combustor 18. Thus, for example, the size of the compressor 14 and the programming of the opening and closing of valve 28 may also be predicated not only on speed of the internal combustion engine 10 but also on the desired maximum value of temperature of the products of combustion entering the turbine 16.

The graph of FIGURE 2 shows the relationship between the rotational speed of the internal combustion engine and the air flow requirements of the arrangement shown in FIGURE 1. The curve $a$ of the graph of FIGURE 2 illustrates the value of the output of air from the compressor 14. As shown, this value is substantially constant for all values of the internal combustion engine speed and thus may be considered substantially independent of the internal combustion engine speed. Curve $b$ illustrates the value of the air required by the internal combustion engine 10 as the speed is increased from zero speed through its idle speed up to its maximum speed. This value of air required by the internal combustion engine 10 continually increases throughout this speed range and depending upon the characteristics of the internal combustion engine 10, the rate of change of the air required as a function of the internal combustion engine 10 speed may be variable. Curve $c$ of FIGURE 2 illustrates the volume of air flowing directly from the compressor 14 through the valve 28 to the combustor 18. As can be seen, this value continually decreases as the air required by the internal combustion engine 10 increases. As described above, this is achieved by proportionately closing the valve 28 as the speed of the internal combustion engine 10 increases. The sum of the ordinate values of curves $b$ and $c$, at any given rotational speed equals the value illustrated by curve $a$ of FIGURE 2. It is obvious, of course, that the valve 28 could be placed in the duct 24 and programmed therein to progressively open as the rotational speed of the internal combustion engine 10 increases. This would achieve the same effect and provide the same characteristics as described above. It may be desirable, in some applications, to have the air compressor 14 come up to speed from zero to full speed between the zero speed and idle rotational speeds of the internal combustion engine 10. This is illustrated in FIGURE 2 by the dashed line curve $a'$ which shows the increase in air flow from the compressor 14 as the engine speed increases from zero to idle speed. In this speed range, the air required by the internal combustion engine is the same as that described above and as illustrated by curve $b$ of FIGURE 2. However, the air flow output from the compressor 14, as illustrated by curve $a'$, is at all times greater than the air flow required by the internal combustion engine 10. The dashed line curve $c'$ of FIGURE 2 illustrates the amount of air that flows directly from the compressor 14 through valve 28 and into the combustor 18 for this configuration. The valve of this air flow at any internal combustion engine speed is the difference between the air supplied by the compressor 14 illustrated by curve $a'$ and the air required by the internal combustion engine 10 illustrated by curve $b$. Since the compressor 14 comes up to its design speed at the idle speed of the internal combustion engine from idle speed to maximum speed, the air flow through the combustor 18 that comes directly from the compressor 14 is illustrated by that corresponding portion of the curve $c$ of FIGURE 2.

It will be appreciated that any number of variations of compressor speed with internal combustion engine speed may be provided as required for a particular configuration. However, it is necessary that not only must the output from the compressor 14 supply the air requirement of the internal combustion engine 10, but also there must be sufficient excess air that flows directly through the combustor 18 to achieve an independent acceleration of the turbine 16 from zero to its design speed. This independent acceleration, of course, is aided by the air flow from the exhaust of the internal combustion engine 10, which as described above, is also burned with the fuel in the combustor 18 to provide the products of combustion that drive the turbine 16. Therefore, it is apparent that there is considerable flexibility in the selection of the size of the compressor 14 and the turbine 16 for a given internal combustion engine 10 as well as in the other parameters governing the installation for a given configuration.

Figure 4:
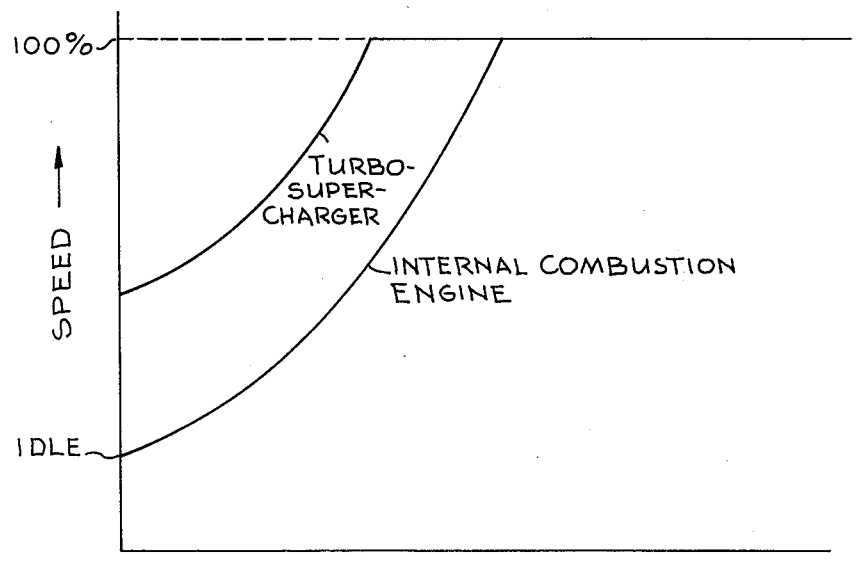
FIGURE 4 is a graph showing the relationships between various operating characteristics of applicant's invention.

In other applications it may be desirable to have the speed of the turbocompressor-supercharger vary as some function of the engine speed during acceleration of the supercharger to full speed and this function may be either independent or a fixed dependent speed relationship in this speed range. For example, if the turbo-supercharger 12 were operated at its design speed throughout all ranges of the speed of the internal combustion engine, it would result in a comparatively high jet-like exhaust flow from the exhaust when the engine is at idle speed. Under these conditions this might prove to be not desirable for street operation. Thus, a progressive increase of the speed or output volume of the turbo-supercharger unit 12 with the internal combustion engine speed may be desired. This is illustrated graphically in the curve of FIGURE 4. As shown in FIGURE 4, the internal combustion engine accelerates from idle to full speed and, in this method of operating applicant's invention, the turbo-supercharger 12 starts at a higher absolute speed than the comparable idle speed of the internal combustion engine 10, to provide a satisfactory air flow and pressure, and accelerates up to its full design rotational speed. The idle speed of the turbo-supercharger 12 is, of course, a higher percentage of its full speed than the idle speed of the internal combustion engine 10 is of its full speed. Thus, the turbo-supercharger 12 comes up to its full rotational speed before the internal combustion engine 10 reaches its full rotational speed.

In some applications of the operation of this embodiment of applicant's invention it may be found that the required output of compressed air for operation of the internal combustion engine 10 to allow the rate of acceleration shown in FIGURE 4 and the flow of air required through the combustor 18 directly from the compressor 14 may be different than the output that would normally be achieved by the compressor 14 rotating at the speeds shown on FIGURE 4. If the total air requirements are less than the corresponding output of the compressor 14 at the speed shown on FIGURE 4, then it may be desirable to incorporate a baffle means 80 with the compressor as illustrated on FIGURE 1. The baffle means 80 is actuated by actuator 82 and is withdrawn or placed in front of the input to the compressor 14 upon receipt of an applicable information signal from the tachometer means 38. Thus, utilizing the internal combustion engine speed as the basic governing parameter, the airflow through the compressor may be regulated to provide only the required airflow for the specified acceleration rates of the internal combustion engine 10 and the turbo-supercharger 12. In this arrangement, of course, the total airflow through the combustor 18 is not constant, but under certain conditions as specified above, it may vary as the airflow requirements are varied.

It may also be desirable to provide a manual override for controlling the rate of acceleration of the turbo-supercharger 12 independently of the internal combustion engine 10. This may be achieved by independently controlling the movement of the baffle 80, fuel valve 42 position and, if desired, the position of the control valve 28.

From the above, it can be seen that applicant's invention herein comprises independent rotational speeds and acceleration rates of a turbo-supercharger from the internal combustion engine that it is supercharging. By achieving this independent control of the two rotational speeds it is possible to provide any desired programming of the speed of one as a function of the speed of the other. As described above, in some applications it may be desirable to have the turbo-supercharger come up to full speed before the internal combustion engine is even started. In other applications it may be desired to have the turbo-supercharger come up to full speed while the internal combustion engine is accelerating from zero to idle speed. In yet other applications it may be desirable to have the turbo-supercharger come up to full speed from some lower speed, while the internal combustion engine is accelerating from idle to full speed. In each of these arrangements, or in any other desired functional relationship between the two speeds, it is apparent that the independent control of the speed of the turbo-supercharger 12 from the speed of the internal combustion engine 10 allows this flexibility of design. The independent control may be achieved by either a controlled relationship between the speed of the internal combustion engine and the turbo-supercharger or by a progressively varying relationship or by a manually operated control system wherein there is no preselected programming of the two speeds. Any of these variations, as described above, achieve a rotational speed of the turbo-supercharger independently of the speed of the internal combustion engine throughout most of the operating speed ranges of the internal combustion engine.

Another advantage of providing the baffle 80 and actuator 82 to control the amount of air flowing through the compressor 14 is that a reverse flow from the combustor 18 back through the valve 28 and into the internal combustion engine 10 is eliminated by allowing only the programming of the proper amount of air required for the desired speed relationship.

The baffle 82 may be utilized with the operation of the supercharger 12 described above wherein the supercharger 12 runs at its design speed throughout the entire speed range of the internal combustion engine 10. In the operation of this embodiment the output pressure from the compressor 14 is substantially constant and only the volume of air that is compressed is varied as a function of the air requirements of the internal combustion engine 10 and turbine 16. The turbine 16 may, if required, be a partial admission turbine to allow a substantially wide variation of gas flow through the turbine 16 for a substantially constant operational speed.

It will also be appreciated that the absolute values of the speed of the internal combustion engine 10 and the compressor 14 are not necessarily and in fact, generally will not be, the same. Thus, typical maximum or full speed of the internal combustion engine 10 may be on the order of 2,500 to 5,000 r.p.m., while the compressor 14 has a design operating speed for its most efficient condition on the order of 10,000 to 25,000 r.p.m. Similarly, the idle speed of the internal combustion engine is generally a much lower percentage of the full speed of the internal combustion engine 10 than is the idle speed of the compressor 14 of the full speed of the compressor 14 and turbine 16 assembly. For example, if the maximum or full speed of the internal combustion engine 10 had a value of 5,000 r.p.m., the idle speed could be only on the order of 500 r.p.m.; while for a maximum or design speed for the compressor 14 and turbine 16, of 12,000 r.p.m., the idle speed will be on the order of 5,000 to 6,000 r.p.m.

Turbo-compressor units such as illustrated on FIGURE 1 may, in some applications, require an externally supplied assist during the initial phases of their acceleration from zero r.p.m. up to a speed called the self-sustaining speed. This may be achieved by an external mechanical or other type of start-up device. For example, it could be an electric starter generally designated 44 coupled to the driveshaft 20 between the turbine and the compressor which, upon receipt of a start signal, will rotate the turbo-compressor comprising compressor 14 and turbine 16 up to a design cut-off speed at which point the turbo-compressor assembly will be self-accelerating up to either an idle or its design rotational speed. In other applications, the exhaust flow from the internal combustion engine may be utilized to accelerate the turbo-supercharger from zero speed to self-sustaining speed.

While the compressor 14 has been designated as a rotary-type compressor, it will be apparent that the compressor 14 may be either a radial flow or an axial flow-type compressor, depending upon the requirements of a particular installation. It is generally more economical, in the size range of superchargers associated with an internal combustion engine in automobiles, to make the compressor 14 a radial flow compressor. In this configuration, the compressor wheel may be fabricated from a comparatively inexpensive casting. Axial flow compressors, on the other hand, are generally more expensive, but in some installations, may provide a higher efficiency and thus lower operating cost. Similarly, the combustor 18 may be of any desired type such as the well-known "can"-type, annular-type, or "cannular"-type. The particular selection of one type of combustor over another will be apparent to those skilled in the art for a given configuration.

While the arrangement shown in FIGURE 1 illustrates the detection of the rotation speed of the internal combustion engine 10, by tachometer means 38 to control valve 28 and thereby control the amount of air flowing directly to the combustor 18 from the compressor 14, it will be apparent that other parameters or operating conditions of the internal combustion engine 10 can, if desired, be monitored to provide the control to the valve 28. Thus, for example, the throttle position that governs the fuel flow to the internal combustion engine 10 could be monitored and the opening and closing of valve 28 be programmed to correspond to a preselected function of the throttle position of the internal combustion engine 10. Similarly, many other operating conditions such as manifold pressure in the internal combustion engine 10 or other characteristics can be monitored for the control of the valve 28 and it is within the contemplation of this invention to include any particular characteristic selected that provides adequate control to the valve 28.

FIGURE 3 shows another arrangement of a turbo-supercharger according to applicant's invention. In this arrangement the exhaust gas from the internal combustion engine is ducted directly to the turbine rather than first passing through the combustor. As shown, a compressor 50 which may be similar to the compressor 14 shown on FIGURE 1 is driven by a turbine 52 through driveshaft means 53 and provides at its discharge compressed air which is divided into a first part that is ducted through duct 54 to pass directly to the internal combustion engine 56 to supply the air requirements thereof. A second part of the output from air compressor 50 is ducted by duct 58 to pass through the valve 60 and directly into the combustor 62. The valve 60 may also be a motor-operated butterfly-type valve controlled by a signal from a tachometer means 64 which measures the rotational speed of the internal combustion engine 56 in a manner analogous to that described above. A separate starter means such as starter 55 may be coupled to driveshaft 53 to provide the initial acceleration to the supercharger.

Fuel from fuel tank 66 is transmitted directly to the internal combustion engine 56 by duct 68 in which it is burned with the first part of the air from compressor 50. Fuel is also transmitted from fuel tank 66 by duct 70 through valve 72 to combustor 62 where it is burned with the second part of the air that flows directly from the compressor 50 into the combustor 62. The exhaust from the internal combustion engine, in this embodiment, is ducted by duct 74 to flow directly from the internal combustion engine to the turbine 52, and in this respect, is somewhat similar to the familiar exhaust-driven superchargers utilized on the reciprocating engines of many aircraft. However, in this embodiment of applicant's invention, before pressing into the turbine 52 the exhaust gases from the internal combustion engine 56 are mixed with the products of combustion from the combustor 62 to provide a substantially constant gas flow into the turbine 52. In this embodiment, the combustor 62 may be made substantially smaller than the combustor 18 shown on FIGURE 1. However, the design of the combustor 62 must be adaptable to accept and burn a variable quantity of air flow since the air flow through combustor 62 varies as the speed of the internal combustion engine 56 changes.

The temperature of the gas entering the turbine 52 is controlled by detecting the temperature of the gas at the entrance to the turbine 52 by thermocouple means 76 which generates a signal proportional to the measured temperature. Thermocouple means 76 transmits its signal to valve 72 to decrease the rate of fuel flow from the fuel tank 66 to the combustor 62 upon the condition that the temperature of the gases entering the turbine 52 exceeds a preselected value. The various methods of operation described above in connection with the embodiment of FIGURE 1 may also be utilized in the operation of this embodiment shown on FIGURE 3.

This concludes the description of applicant's invention. Those skilled in the art will find many variations and adaptations of applicant's invention herein and the appended claims are intended to include all such variations and adaptations falling within the true scope and spirit of this invention. The foregoing specification and annexed drawings have presented the preferred embodiment of applicant's invention and are not intended to be limiting in the consideration of the variations possible predicated upon applicant's invention.

The embodiments of the invention in which an exclusive property or privilege is claimed are defined as follows:

1. A supercharged internal combustion engine comprising, in combination:

an internal combustion engine adapted to burn a mixture of compressed air and fuel;

a turbo supercharger comprising an air compressor driven by a hot gas turbine and a combustor;

means for dividing the compressed air discharged by said air compressor into a first part and a second part;

means for delivering said first part of said compressed air to said internal combustion engine and for delivering said second part of said compressed air to said combustor;

means for delivering exhaust gases from said integral combustion engine to said combustor;

means for burning said mixture of said compressed air with said exhaust gases in said combustor to thereby generate a turbine driving gas mixture including means for admitting fuel at a controllable flow rate into said combustor;

means for delivering said turbine driving gas mixture to said turbine for driving said turbine and said air compressor at a substantially constant speed substantially independent of the speed of said internal combustion engine;

detection means for detecting a preselected operating characteristic of said internal combustion engine;

flow divider control means for controlling the amount of air in said first part of said compressed air in response to said detected operating characteristics of said internal combustion engine; and baffle means adjacent the air inlet on said air compressor for varying the amount of air flow into said air compressor in response to said detected operating characteristic of said internal combustion engine.

2. A turbo supercharger of the kind adapted to be utilized to increase the power output of an internal combustion engine and having an air compressor driven by a hot gas turbine and the turbine being powered by a mixture of the exhaust gases from the internal combustion engine with the products of combustion generated in a combustor comprising, in combination:

an internal combustion engine adapted to burn a mixture of compressed air and fuel;

a turbo supercharger comprising an air compressor driven by a hot gas turbine and a combustor;

means for dividing the compressed air discharged from said air compressor into a first part and a second part;

means for transmitting said first part of said compressed air to said internal combustion engine;

means for transmitting said second part of said compressed air to said combustor;

means for transmitting the exhaust gas from said internal combustion engine to said combustor;

means for controllably increasing temperature of the gases passing through said combustor, to generate a turbine driving gas mixture for driving said turbine at a substantially constant speed substantially independent of the speed of the internal combustion engine for internal combustion engine speeds within a preselected speed range, and said turbine driving gas mixture having a substantially constant volumetric flow rate for said internal combustion engine having a speed within said preselected speed range;

detection means for detecting the rotational speed of said internal combustion engine;

flow divider control means for controlling the amount of air in said first part of said compressed air in response to said detected speed of said internal combustion engine; and baffle means adjacent the air inlet on said air compressor for varying the amount of air flow in said air compressor in response to said detected rotational speed of said internal combustion engine.

3. A turbo supercharger of the kind adapted to be utilized to increase the power output of an internal combustion engine and having an air compressor driven by a hot gas turbine and a turbine being powered by a mixture of the exhaust gases from the internal combustion engine with the products of combustion generated in a combustor comprising, in combination:

an internal combustion engine adapted to burn a mixture of compressed air and fuel;

a turbo supercharger comprising an air compressor driven by a hot gas turbine and a combustor;

means for dividing the compressed air discharged from said air compressor into a first part and a second part;

means for transmitting said first part of said compressed air to said internal combustion engine;

means for transmitting said second part of said compressed air to said combustor;

means for mixing the exhaust gases from said internal combustion engine with the gases discharged from said combustor including means for controllably increasing the temperature of the gases passing through said combustor, to generate a turbine driving gas mixture for driving said turbine at a substantially constant speed substantially independent of the speed of said internal combustion engine within a preselected speed range, and said turbine driving gas mixture having a substantially constant volumetric flow rate for said internal combustion engine having a speed within said preselected speed range;

detection means for detecting the rotational speed of said internal combustion engine; and flow divider control means for controlling the amount of air in said first part of said compressed air in response to said detected rotational speed of said internal combustion engine.

References Cited by the Examiner
UNITED STATES PATENTS

| | | | |
|---|---|---|---|
| 2,608,051 | 8/52 | Nettel | 60—13 |
| 2,664,957 | 1/54 | Catford et al. | |
| 3,007,302 | 11/61 | Vincent | 60—13 |
| 3,096,615 | 7/63 | Zuhn | 60—13 |

RICHARD B. WILKINSON, *Primary Examiner.*

JULIUS E. WEST, *Examiner.*